United States Patent Office 3,354,204
Patented Nov. 21, 1967

3,354,204
PERFLUOROALKYLTHIOAMIDES
Edwin Dorfman, Grand Island, and Claude Thomas Bean, Jr., Niagara Falls, N.Y., assignors to Hooker Chemical Corporation, Niagara Falls, N.Y., a corporation of New York
No Drawing. Filed Jan. 21, 1965, Ser. No. 427,116
5 Claims. (Cl. 260—551)

This invention relates to perfluoroalkylthioamides as new compositions of matter and to a process for preparing them.

In accordance with this invention there are provided perfluoroalkylthioamides of the formula:

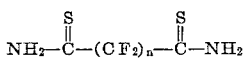

wherein $n$ is a number from 1 to 22. The perfluoroalkylthioamides of this invention are prepared by dissolving perfluoroalkylamidine in a solvent while maintaining the solution at a low temperature, passing hydrogen sulfide into the solution until the perfluoroalkylimidine is consumed and thereafter recovering the perfluoroalkylthioamide. The perfluoroalkylthioamides of this invention are useful in preparing fluorocarbon polymers having the characteristics repeating linking units:

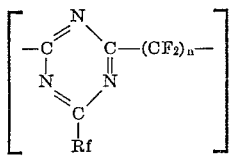

These polymers are useful in preparing articles to withstand high temperatures and/or be chemically inert.

The perfluoroalkylthioamides of this invention are prepared from the corresponding perfluoroalkylimidines in a manner like that in which, for example, hexafluorothioglutaramide is produced by the reaction of hydrogen sulfide and hexafluoroglutarimidine. Among the imidines which may be conveniently utilized to prepare the perfluoroalkylthioamides of this invention are perfluoromalonimidine, perfluorosuccinimidine, perfluoroadipimidine, perfluorosuberimidine, perfluoroazelaidimidine, perfluorosebacimidine, perfluoro-1,18-octadecaneimidine and perfluoro-1,20-eicosaneimidine.

The perfluoroalkylimidine reactant utilized in this invention is dissolved in a solvent such as ethyl ether to facilitate the reaction of hydrogen sulfide. Other suitable solvents which may be used in the place of the diethyl ether presently preferred for use in the process of this invention include tetrahydrofuran, benzene, toluene and dimethoxyethane.

The time of reaction is dependent upon the quantities of reactants charged to the reaction vessel and the temperature employed. The reaction is continued until all the perfluoroalkylimidine reactant has been consumed by the hydrogen sulfide. The reaction may be continued for a period of one-half to 20 hours and a period of 2 to 12 hours is highly satisfactory. The terminal point is readily observable by change in exotherm and precipitation.

While the process of this invention may be carried out over a wide temperature range, it is generally desirable to maintain the reaction at a temperature about —30 to about +40 degrees centigrade and preferably of about —20 to about +10 degrees centigrade. It is an advantage of the process of this invention that it may be carried out at normal atmospheric pressure and without resort to protective blankets of inert gases. The molar ratio of hydrogen sulfide to perfluoroalkylimidine employed in the process of this invention is desirably from about 2:1 to about 9:1 and preferably from about 2.5:1 to about 7:1.

The invention is illustrated by the following examples, in which parts are given by weight and temperatures are in degrees centigrade.

Example 1

Into a reaction vessel equipped with stirrer, gas inlet tube and drying tube, a solution of 20 parts of perfluoroglutarimidine and 80 parts of ether was treated with hydrogen sulfide maintained at a temperature of about zero degrees centigrade, until the reaction ceased which was about three hours. The residue was freed of ether, washed with water, filtered and dried under vacuum conditions. The solid was then dissolved in methanol and filtered free of the elemental sulfur by-product formed during the reaction. The methanol solution was evaporated to dryness and the residue was recrystallized from chloroform. The yellow solid product had a melting point of 139 degrees centigrade.

*Analysis* ($C_5H_4F_6N_2S_2$).—Theory: nitrogen 10.36 percent; sulfur 23.70 percent. Found: nitrogen 10.54 percent; sulfur 24.09 percent.

The product was perfluoroglutarthioamide having the chemical structure:

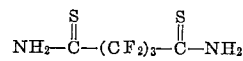

Example 2

A Carius tube was sealed with 4 parts of perfluoroglutarthioamide, 10 parts of perfluorobutyronitrile and 4 parts of triethylamine inside. The mixture was heated 18 hours at 50 degrees centigrade. The volatile components were then distilled off, leaving a dark residue of triazine polymer, identified by infrared absorption at 1550 microns. The polymer is suitable for use where chemical inertness and heat stability are required.

Corresponding polyfluoroalkylthioamides of this invention are prepared in the manner of Example 1 when perfluoroglutarimidine is replaced by an equimolar amount of other perfluoroalkylimidines such as perfluoromalonimidine, perfluorosebacimidine, perfluorosuberimidine, perfluoroadipimidine, perfluor-1,18-octadecaneimidine or perfluoro-1,20-eicosaneimidine.

Although certain preferred embodiments of the invention have been disclosed for the purpose of illustration, it will be evident that various changes and modifications may be made therein without departing from the scope and spirit of this invention.

What is claimed is:

1. The compound of the formula:

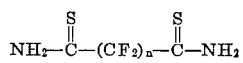

wherein $n$ is from 1 to 3.

2.

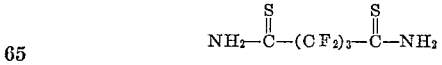

3. A process for preparing a perfluoroalkylenedithiodiamide wherein the alkylene moiety has from 1 to 3 carbon atoms by dissolving perfluoroalkyleneimidine in a solvent therefor and maintaining this solution at a low temperature of between about minus 30 and about plus 40 degrees centigrade, and passing hydrogen sulfide into the solution in a molar ratio of hydrogen sulfide to perfluoroalkyleneimidine of from between about 2:1 and about 9:1 until the perfluoroalkyleneimidine is consumed.

4. The process of claim 3 wherein the reaction medium is maintained at a temperature of about minus 20 to about plus 10 degrees centigrade.

5. A process for preparing perfluoroglutarthioamide by dissolving perfluoroglutarimidine in a solvent therefor and maintaining the solution at a low temperature of between about minus 30 and about plus 40 degrees centigrade, passing hydrogen sulfide into the solution in a molar ratio of hydrogen sulfide to perfluoroalkyleneimidine of from between about 2:1 and about 9:1 and reacting the hydrogen sulfide with the perfluoroglutarimidine until the perfluoroglutarimidine is consumed.

No references cited.

WALTER A. MODANCE, *Primary Examiner.*

H. I. MOATZ, *Assistant Examiner.*